United States Patent [19]

Long

[11] 3,990,747
[45] Nov. 9, 1976

[54] DUAL WHEEL ASSEMBLY

[76] Inventor: Ralph I. Long, 13791 Webb Road, Jacksonville, Fla. 32218

[22] Filed: Sept. 9, 1975

[21] Appl. No.: 611,697

[52] U.S. Cl. .......................... 301/13 SM; 301/36 R
[51] Int. Cl.² ............................................ B60B 23/00
[58] Field of Search ................ 152/376; 301/1, 5 R, 301/6 R, 6 A, 6 E, 10 R, 13 R, 13 SM, 12 R, 36 R, 36 WP, 38 R, 40 R, 40 S, 115

[56] References Cited
UNITED STATES PATENTS

| | | | |
|---|---|---|---|
| 3,790,218 | 2/1974 | Johns | 301/36 R |
| 3,871,709 | 3/1975 | Eaton | 301/6 A |
| 3,885,834 | 5/1975 | Edwards | 301/36 R |

Primary Examiner—Robert B. Reeves
Assistant Examiner—H. Grant Skaggs
Attorney, Agent, or Firm—George H. Baldwin; Arthur G. Yeager

[57] ABSTRACT

A cylindrical elongated spacer is welded at one of its ends to an internal flange of the outer rim, the spacer including an inwardly extending split ring member, having a stop adjacent each side of the split and a wedging surface affixed therewithin adjacent the spacer other end, such end being removably engaged against an internal flange of the inner rim, which in turn is backed by a common hub stop. Selective releasable lugs engage against the wedging surface to retain the spacer in such engagement and to connect the spacer to the hub portion.

A reinforcing circular member is welded juxtaposed to the spacer other end which also engages against the inner rim flange, and a plurality of arcuate reinforcing members are welded to and between a lip of the outer rim and the spacer.

9 Claims, 3 Drawing Figures

DUAL WHEEL ASSEMBLY

BACKGROUND OF THE INVENTION

1. FIELD OF THE INVENTION

This invention relates to dual wheel assemblies and more particularly to the replacement of a standard dual wheel assembly by a substantially wider dual wheel assembly without modification of the attachment means for connecting the wheel assembly to the hub portion of a vehicle.

2. DESCRIPTION OF THE PRIOR ART

Prior attempts to substantially widen the wheel assemblies on, for example, agricultural vehicles including fertilizer spreaders, have presented many problems. One such prior arrangement replaces the short threaded studs on the spokes of the hub portion with much longer studs and a plurality of plates were welded to the internal flange of the outer rim, and the studs extended through such plates with the spacer also welded to the internal flange and sandwiched between the outer rim and the inner rim. Another prior arrangement had a plurality of saddles attached internally within the spacer adjacent the spokes which fit onto respective spokes, and the studs passed therethrough and nuts were threaded onto the studs to affix the saddles to the spokes.

While being somewhat effective, such prior arrangements have presented many problems particularly in removing the short threaded studs from the spokes and replacing same with longer ones, in the slippage which occurred between the hub, rims and spacer caused by play in the saddles, and/or the elongated studs, and the overall lack of proper support and rigidification which is required in providing appropriate dual wheel assemblies for such vehicles.

SUMMARY OF THE INVENTION

In accord with the broad aspects of this invention a wide dual wheel assembly is provided for a vehicle, the assembly including a hub portion, an inner rim, an outer rim and a cylindrical elongated spacer disposed between such rims. Unitarily connecting one spacer end portion to the outer rim, is a weld extending substantially completely therearound, with an inwardly extending mounting means located within and affixed to the spacer at its other end portion. Selective releasable means engage against the mounting means to retain the spacer in removable engagement against the inner rim and to connect the spacer to the hub portion.

Other aspects of this invention relate to the inner and outer rim including internal circular flanges disposed in face to face relation with the weld uniting the spacer one end portion to the outer rim flange, the other end portion having a circular edge engaged against the inner rim flange, and a reinforcing circular member welded juxtaposed to a circular edge of the spacer other end portion and being engaged against the same inner rim flange.

The outer rim has a circular lip facing the inner rim and spaced outwardly from the outer surface of the cylindrical spacer, and a plurality of arcuate reinforcing plates extend outwardly from the outer surface of the spacer and are welded thereto and to the outer rim lip.

Additional aspects herein disclosed relate to a split ring member being the mounting means and welded to the inner surface of the spacer, with the selective means including a plurality of lugs respectively mounted to the spokes of the hub portion and engageable with the ring member. The ring member has a wedging surface adjacent the outer rim which is engaged by the lugs, and the mounting means also includes stop means engageable by the lugs to inhibit relative rotation between the spacer and hub portion. A hub portion stop is engaged by the inner rim with the releasable means engaging the wedging surface and forcibly sandwiching the inner rim between the spacer and hub portion stop.

A general object of this invention is to provide an improved dual wheel assembly.

A specific object is the provision of a wheel assembly with expanded tire track widths without modification of the hub portion or the attachment thereto.

Particular objects are to provide a dual wheel assembly easy to fabricate and install, rugged in use, inexpensive in construction, installation and maintenance, and which solves the problems of the prior arrangements.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENT

Figure 1:
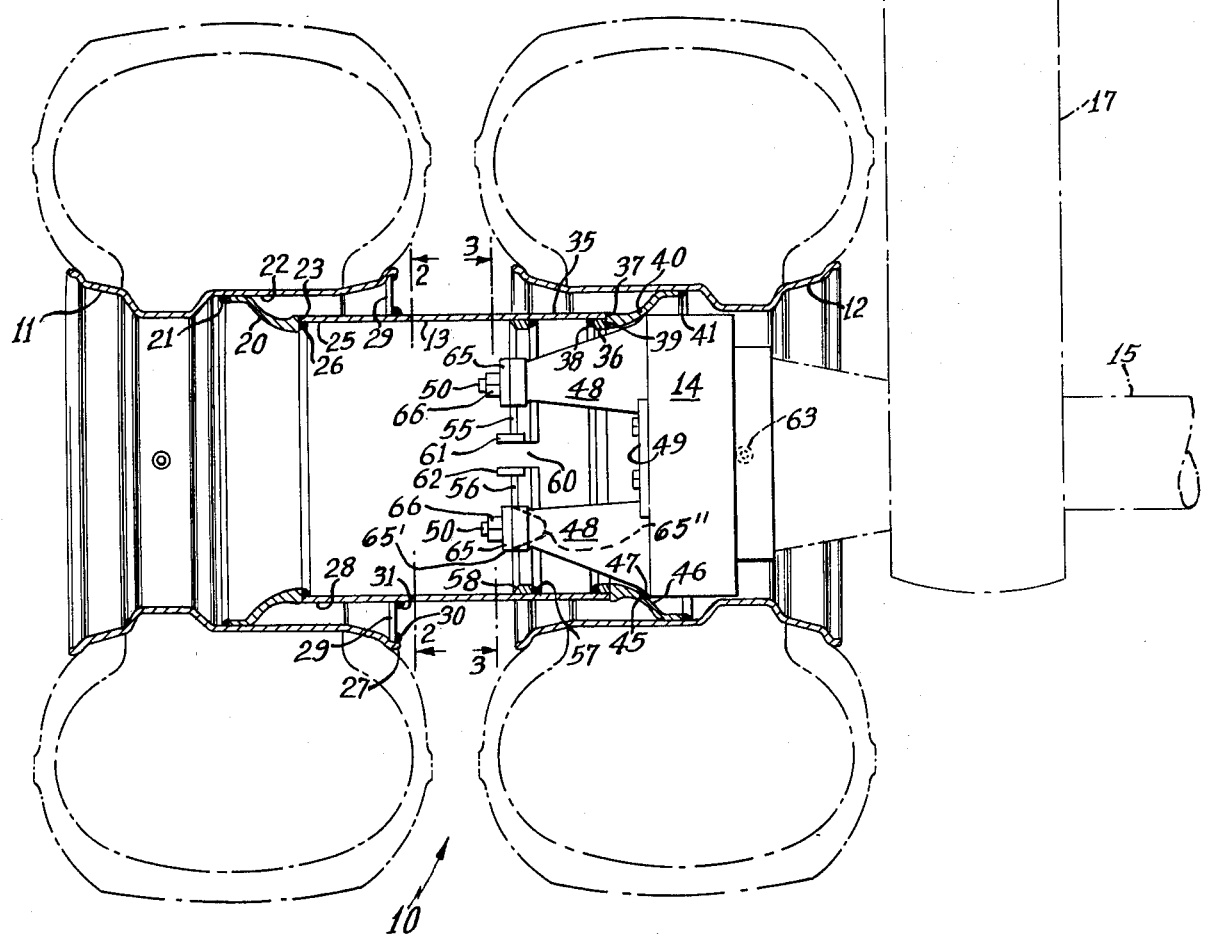
FIG. 1 is a cross-sectional view of the dual wheel assembly in accord with this invention taken parallel to the axis of the axle and hub assembly, with portions of the vehicle being shown generally by broken lines.

Referring now more particularly to the drawing, the dual wheel assembly is generally designated by numeral 10 in FIG. 1 and includes an outer rim 11, and inner rim 12 and an elongated cylindrical spacer 13, the assembly being suitably mounted on the hub portion 14 of axle 15 of vehicle 16, as will be more fully described hereinafter. The vehicle 16, for example, may have been manufactured for a normal dual wheel assembly which provided a total track width of the two tires of about 30 inches, and this dual wheel assembly 10 is designed to replace such normal assembly to provide a total track width of about 50 inches.

Figure 2:
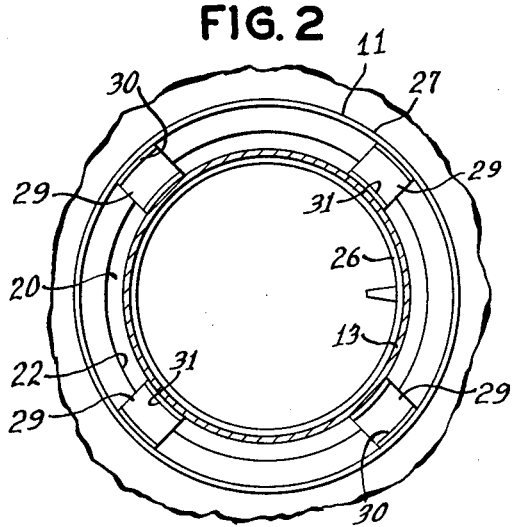
FIG. 2 is a cross-sectional view taken along line 2—2 of FIG. 1.
Figure 3:
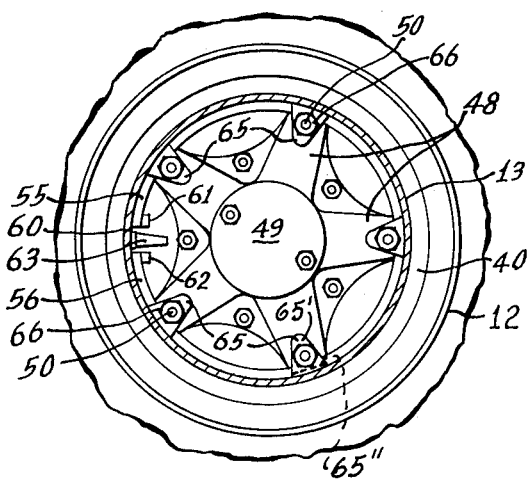
FIG. 3 is a cross-sectional view taken along line 3—3 of FIG. 1.

The outer rim 11 includes an inner flange 20 which is welded by weld 21 to the inner surface 22 thereof, flange 20 terminating in an inwardly facing edge 23 to which one end portion 25 of spacer 13 is affixed by weld means 26 within the spacer 13. An inwardly facing lip 27 of the rim 11 is spaced outwardly of the spacer outer surface 28, and a plurality of arcuate reinforcing members 29 are spacedly welded by respective welds 30 and 31 to lip 27 and spacer outer surface 28, as clearly indicated by reference to FIGS. 1 and 2.

The spacer other end portion 35 includes a circular reinforcing member 36 which is juxtaposed with respect to circular edge 37 of end portion 35, member 36 being affixed internally of spacer 13 by weld 38. Edge 37 and reinforcing member edge 39 engage against internal flange 40 which is in turn welded by weld 41 to inner rim 12. Hub portion 14 includes stop means 45 engaged against shoulder 46 of the internal flange 40 of inner rim 12 to fix the position of the rim 12 with respect to the axle support 17 of the vehicle, stop means 45 including a plurality of spaced shoulders 47 being the respective bases of spokes 48 of the hub portion 14. The common wheel axle plate 49 is centrally located with the spokes 48 being equally spaced therearound and outwardly extending threaded studs 50 are affixed to the spokes 48.

Mounting means 55 in the form of a split ring 56 is affixed to end portion 35 of spacer 13 by weld 57, ring 56 including a wedging surface 58 adjacent the outer rim 11 which tapers inwardly toward inner rim 12. Adjacent the split 60 are stop means in the form of two small plates 61 and 62 which may engage a lug (hereinafter described) to prevent relative rotation between rim 12 and the hub portion 14, as is well known in the art, so that inadverdent damage or removal of the inner tire valve 63, shown in broken lines, is inhibited. Selectively releaseable means in the form of a plurality of lugs 65 have respective openings (not shown) therethrough which fit onto respective studs 50 and nuts 66 are threaded thereon to releasably connect the lugs to the spokes. The lugs 65 are generally L-shaped with the upper vertical portion or leg 65' of the L having the opening (not shown) therethrough which pass stud 50, and the lower horizontal portion or leg 65" of the L engages against wedging surface 58 to force the spacer 13, with outer rim 11 secured thereto, into engagement with inner rim flange 40 thereby sandwiching inner rim 12 between spacer end portion 35 and hub portion shoulder means 45.

Thus, it can be seen that a rigid construction of an extended spacer 13 and outer rim 11 is provided by weld 26, reinforcing plates 29 and welds 30 and 31, with the spacer 13 and rim 11 being releasably attached to the hub portion 14 by the normal lugs 65, studs 50 and nuts 66 without any modification thereto, and the same releasable attachment firmly secures the inner rim 12 to the hub portion 14 by squeezing inner rim 12 between the spacer 13 and shoulder means 45 of hub portion 14.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a dual wheel assembly having a hub portion including a plurality of spokes, an inner rim and an outer rim, the improvement comprising a cylindrical elongated spacer having opposite end portions, weld means for unitarily connecting one of said end portions of said spacer to said outer rim, and inwardly extending mounting means located within and affixed to said spacer spacedly therealong from said one end portion toward the other of said end portions, said mounting means including a ring member welded to the inner surface of said spacer and being located in a plane substantially parallel to the planes of the ends of said spacer, said other end portion being removably engaged against said inner rim, and selective releasable means engageable against said mounting means to retain said spacer in such engagement and to connect said spacer to said hub portion of the wheel assembly, said selective means including a plurality of lugs respectively mounted to said hub portion spokes and engageable with said ring member.

2. In the assembly as defined in claim 1 wherein said ring member includes a wedging surface adjacent said outer rim, said lugs being engageable against said wedging surface, said selective releasable means including screw means for attaching said lugs to said hub portion spokes.

3. In the assembly as defined in claim 1 wherein said ring member is split, said mounting means further including stop means adjacent said split of said ring member and engageable by said lugs to inhibit relative rotation between said spacer and said hub portion.

4. In the assembly as defined in claim 1 wherein said inner rim and outer rim include circular flanges disposed in face to face relation, said weld means affixing said one end portion of said spacer to said outer rim flange, said other end portion having a circular edge engaged against said inner rim flange.

5. In the assembly as defined in claim 4 further comprising a reinforcing circular member welded juxtaposed to said circular edge of said other end portion and being engaged against said inner rim flange.

6. In the assembly as defined in claim 4 wherein said outer rim has a circular lip facing said inner rim and spaced outwardly from said spacer, further comprising reinforcing means extending outwardly from said spacer and welded to said spacer and said lip.

7. In the assembly as defined in claim 1 wherein said ring member has a wedging surface adjacent said outer rim which is engaged by said lugs, said inner rim and outer rim including internal circular flanges disposed in face to face relation, said weld means affixing said spacer one end portion to said outer rim flange, said spacer other end portion having a circular edge engaged against said inner rim flange, a reinforcing member welded juxtaposed to said circular edge of said other end portion and being engaged against said inner rim flange.

8. In the assembly as defined in claim 1, wherein said mounting means includes stop means engageable by said lugs to inhibit relative rotation between said spacer and said hub portion.

9. In the assembly as defined in claim 1 wherein said hub portion includes a stop means engaged by said inner rim, said selective releasable means engaging said mounting means and forcibly sandwiching said inner rim between said spacer and stop means.

* * * * *